United States Patent
Lin

(10) Patent No.: US 8,360,666 B2
(45) Date of Patent: Jan. 29, 2013

(54) METHOD FOR ASSEMBLING CAMERA MODULE

(75) Inventor: Ming-Yuan Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 33 days.

(21) Appl. No.: 12/981,542

(22) Filed: Dec. 30, 2010

(65) Prior Publication Data

US 2011/0311213 A1  Dec. 22, 2011

(30) Foreign Application Priority Data

Jun. 22, 2010  (TW) .............................. 99120213 A

(51) Int. Cl.
*G03B 17/00* (2006.01)

(52) U.S. Cl. ...................................... 396/529; 396/535

(58) Field of Classification Search .................. 396/529, 396/535
See application file for complete search history.

(56) References Cited

U.S. PATENT DOCUMENTS

| | | | | |
|---|---|---|---|---|
| 7,990,460 | B2 * | 8/2011 | Wenstrand et al. | 348/349 |
| 8,180,212 | B2 * | 5/2012 | Koo | 396/89 |
| 2005/0153600 | A1 * | 7/2005 | Lu | 439/607 |
| 2007/0122146 | A1 * | 5/2007 | Ryu | 396/529 |
| 2007/0126915 | A1 * | 6/2007 | Webster et al. | 348/340 |
| 2009/0169198 | A1 * | 7/2009 | Chang | 396/529 |
| 2011/0311213 | A1 * | 12/2011 | Lin | 396/529 |
| 2011/0311214 | A1 * | 12/2011 | Lin et al. | 396/535 |

* cited by examiner

*Primary Examiner* — W. B. Perkey

(74) *Attorney, Agent, or Firm* — Altis Law Group, Inc.

(57) ABSTRACT

A camera module includes a lens assembly and a baseboard assembly mounted on the lens assembly. The lens assembly includes a lens, a barrel receiving the lens, and a support receiving the barrel. The baseboard assembly includes a circuit board and an image sensor on the circuit board. The support defines a clamping recess at an outer surface thereof.

4 Claims, 2 Drawing Sheets

METHOD FOR ASSEMBLING CAMERA MODULE

BACKGROUND

1. Technical Field

The present disclosure relates generally to camera modules, and especially to a camera module and method for assembling the same.

2. Description of Related Art

A commonly used camera module generally includes a lens assembly and a baseboard assembly mounted on the lens assembly. In assembly, a fixture may be employed for moving the lens assembly on the baseboard assembly, so that the base assembly and the lens assembly can be packaged together. However, manufacturing errors of the lens assembly or baseboard assembly or positioning errors of the lens assembly can restrict the lens assembly from being accurately fixed on the baseboard assembly in a specific position, resulting in low image quality.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
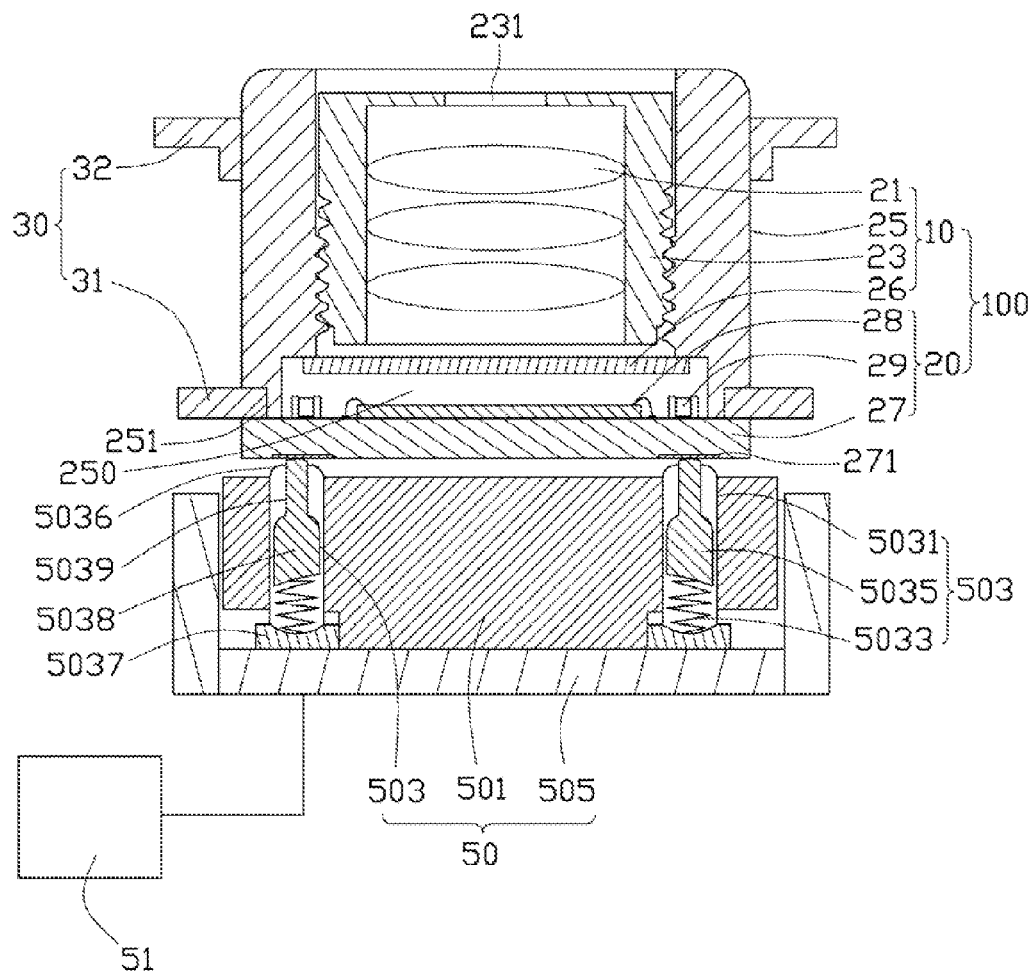
FIG. 1 is a cross section of an embodiment of a camera module.

Referring to FIG. 1, an embodiment of a camera module 100 includes a lens assembly 10 and a baseboard assembly 20. The lens assembly 10 includes a lens 21, a barrel 23 receiving the lens 21, a support member 25 for receiving the barrel 23, and a filter 26. The barrel 23 defines a light hole 231 at an end. The support member 25 defines a receiving chamber 250 at an end for receiving the filter 26. The filter 26 is mounted in the receiving chamber 250. The barrel 23 defines an outer thread (not labeled) at an outer surface thereof. The support 25 defines an inner thread (not labeled) corresponding to the outer thread of the barrel 23. The barrel 23 is mounted in the support member 25 by threaded engagement, and the filter 26 faces the light hole 231 of the barrel 23 for receiving light from the light hole 231. The baseboard assembly 20 includes a baseboard 27, an image sensor 28 at a surface of the baseboard 27, and two electrical members 29. The two electrical members 29 are arranged on the baseboard 27 on both sides of the image sensor 28 respectively, and electrically connected to the baseboard 27 by a cable (not labeled). The baseboard 27 includes a pair of contact sheets 271 at a surface away from the image sensor 28. The contact sheets 271 connect to a display device 51. In the illustrated embodiment, the electrical member 29 is an electrical resistor. Alternatively, the electrical member 29 may be a capacitor or inductor, enhancing a function of the baseboard assembly 20. The baseboard assembly 20 is mounted at an end of the barrel 23, adjacent to the filter 26, and the image sensor 28 and the electrical members 29 are fixed in the receiving chamber 250. Light from the light hole 231 passes through the lens 21, the filter 26 and is finally incident upon the image sensor 28, forming an image. Infrared light may be blocked by the filter 26, thus image quality can be improved. The barrel 25 defines a clamping recess 251 at an outer surface, and a moveable fixture 30 can be employed for clamping and moving the support 25.

Figure 2:
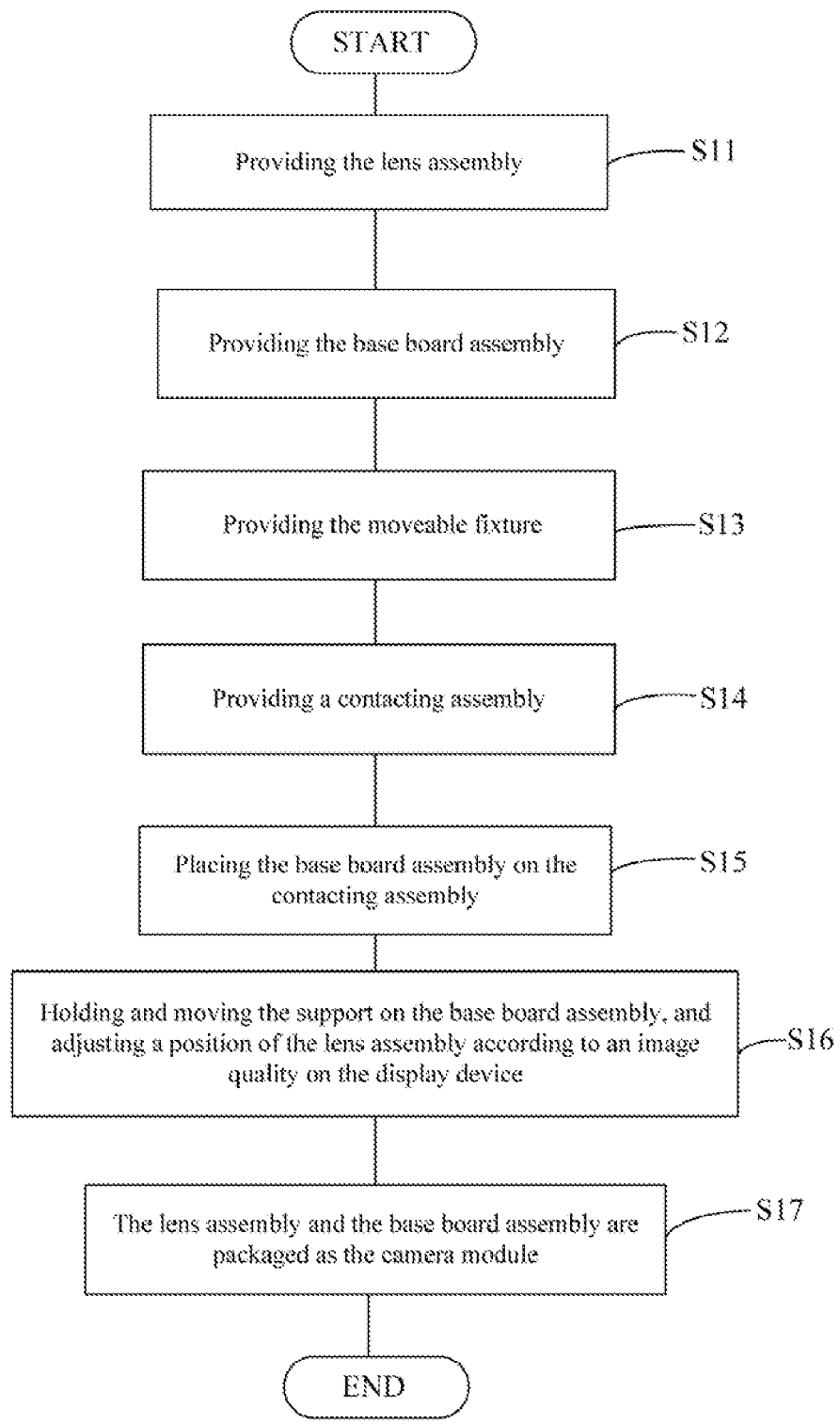
FIG. 2 is a flowchart of a method for assembling the camera module of FIG. 1.

Referring to FIG. 2, a method for assembling the camera module 100 is illustrated as follows.

In a first step 11, a lens assembly 100 is provided, with a clamping recess 251 defined on the support 25.

In a second step 12, a baseboard assembly 20 is provided.

In a third step 13, a moveable fixture 30 is provided. In the illustrated embodiment, the moveable fixture 30 includes a first clamping member 31 and a second clamping member 32. The first clamping member 32 is capable of being partially received in the clamping recess 250, and holding the support 25.

In a fourth step 14, a contact assembly 50 and a display device 51 are provided. The contact assembly 50 includes a main body 501, a pair of probes 503, and a circuit board 505. The main body 501 is fixed on the circuit board 505. Each probe 503 includes a sleeve 5031, a spring 5033 received in the sleeve 5031, and a head 5035. The sleeve 5031 is fixed in the main body 501 with both ends of the sleeve 5031 extending out of the main body 501. The sleeve 5031 forms a limiting portion 5036 at an end away from the circuit board 505, and forms a connecting portion 5037 covering the sleeve 5031 at the other end. The probe 5035 includes a fixing portion 5038 and a contacting portion 5039 extending from an end of the fixing portion 5038. A diameter of the fixing portion 5038 is substantially equal to an inner diameter of the sleeve 5031, and a diameter of the contacting portion 5039 is slightly less than that of the fixing portion 5038. An end of the spring 5033 is fixed at an end of the fixing portion 5038 away from the contacting portion 5039, and the other end of the spring 5033 is fixed on the connecting portion 5037. The spring 5033 resists the probe 5035 to impel the contacting portion 5039 through the limiting portion 5036, to partially extend out of the sleeve 5031. The fixing portion 5038 is blocked by the limiting portion 5036, thus the fixing portion 5038 is capable of sliding in the sleeve 5031 and compressing the spring 5033, but cannot be detached from the sleeve 5031. The circuit board 505 is connected to the display device 51 by a cable (not labeled).

In a fifth step 15, the baseboard assembly 20 is placed on the contact assembly 50, and the probe 503 is connected to the baseboard 27.

In the sixth step 16, the support 25 is held and moved on the baseboard assembly 10 by the first clamping member 31 and the second clamping member 32. The first clamping member 31 is partially received in the clamping recess 251, thus the first clamping member 31 is at a side of the support 25 to ensure that support 25 contacts the contact assembly 50. Each probe 503 resists one of the contact sheets 271. Light from the light hole 231 passes through the filter 26 and incident upon the image sensor 28. The image sensor 28 converts optical signals of the light into electrical signals, and the electrical signals are transmitted to the display device 51 via the baseboard 27, the probes 503, and the contact assembly 50. A position of the lens assembly 10 relative to the image sensor 28 can be adjusted by the first clamping member 31 and the second clamping member 32 according to an image quality on the display device 50, to mount the lens assembly 10 properly, whereby image quality can be improved. The baseboard 27 may be mounted on the support member 25 by surface mount technology.

In the seventh step 17, the lens assembly 10 and the baseboard assembly 20 are packaged as the camera module 100. In the assembly process, the support 25 is held tightly by the moveable fixture 30 in a predetermined position, such that movement of the lens assembly 10 relative to the baseboard assembly 20 can be prevented.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A method for assembling a camera module, comprising:
   providing a camera module comprising a lens, a barrel receiving the lens, and a support member receiving the barrel, the support member defining a clamping recess at an outer surface thereof;
   providing a baseboard assembly, the baseboard assembly comprising a baseboard and an image senor on the baseboard receiving optical signals from the lens and converting the optical signals into electrical signals;
   providing a contact assembly supporting the baseboard, the contact assembly comprising a circuit board and a probe moveably positioned on the circuit board;
   providing a moveable fixture comprising a first clamping member holding the support member at the clamping recess and a second clamping member holding the support member;
   providing a display device connected to the contact assembly and converting the electrical signals into an image;
   placing the baseboard assembly on the contact assembly with the probe connected to the baseboard and transmitting the electrical signals to the display device;
   moving the lens assembly on the baseboard assembly and adjusting a position of the lens assembly relative to the baseboard according to an image quality; and
   mounting the baseboard on the lens assembly.

2. The method of claim 1, wherein the baseboard is mounted on the lens assembly by surface mounted technology.

3. The method of claim 1, wherein the probe comprises a sleeve, a probe head moveably mounted in the sleeve, and a spring in the sleeve resisting the probe head, thus the probe head is capable of being electrically connected to the baseboard.

4. The method of claim 3, wherein the baseboard assembly further comprises a contact sheet at a surface of the baseboard away from the image sensor contacting with the probe.

* * * * *